Figure 1:
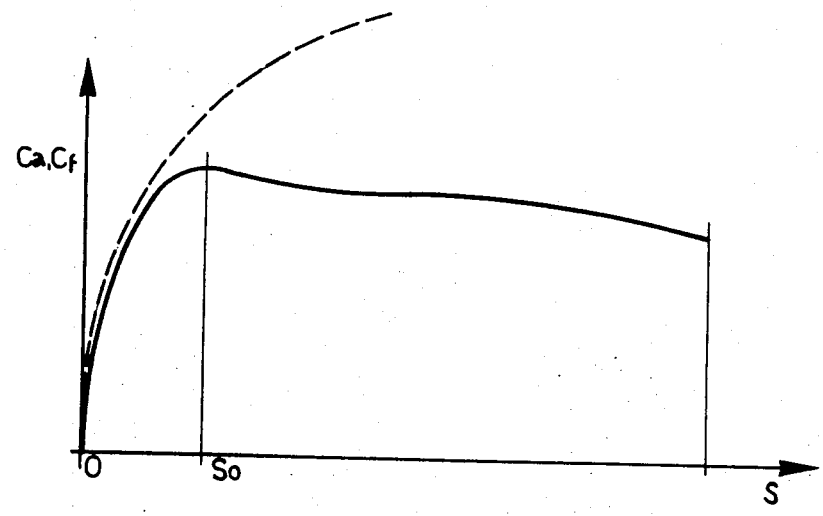

United States Patent [19]
Michellone et al.

[11] 3,709,566
[45] Jan. 9, 1973

[54] METHOD AND APPARATUS FOR THE ANTI-SKID BRAKING OF VEHICLES

[75] Inventors: Giancarlo Michellone, Cambiano; Mario Palazzetti; Giovanni Tabasso, both of Turin, all of Italy

[73] Assignee: Fiat Societa per Azioni, Turin, Italy

[22] Filed: Feb. 24, 1971

[21] Appl. No.: 118,259

[30] Foreign Application Priority Data

March 9, 1970 Italy..................................67781 A/70

[52] U.S. Cl.................................303/21 BE, 303/20
[51] Int. Cl................................................B60t 8/12
[58] Field of Search...............188/181 A; 303/20, 21; 324/162; 340/262

[56] References Cited

UNITED STATES PATENTS

| 3,017,145 | 1/1962 | Yarber | 303/21 P |
| 3,467,444 | 9/1969 | Leiber | 303/21 B |
| 3,532,393 | 10/1970 | Riordan | 303/21 BE |
| 3,604,760 | 9/1971 | Atkins | 303/21 BE UX |

FOREIGN PATENTS OR APPLICATIONS

| 1,949,682 | 4/1970 | Germany | 303/21 BE |

*Primary Examiner*—Milton Buchler
*Assistant Examiner*—Stephen G. Kunin
*Attorney*—Sughrue, Rothwell, Mion, Zinn & Macpeak

[57] ABSTRACT

A vehicle anti-skid braking system which shortens the time required to reduce an excessive slip of the wheel by ascertaining the instant when the wheel acceleration becomes zero after braking has been released and by keeping constant the braking torque on the wheel at the value it reaches after a predetermined time has elapsed from such instant, braking being resumed when the acceleration of the wheel again begins to decrease.

4 Claims, 7 Drawing Figures

METHOD AND APPARATUS FOR THE ANTI-SKID BRAKING OF VEHICLES

The present invention relates to an anti-skid braking method for vehicles.

The invention also relates to a braking installation for carrying the aforesaid method into effect.

Methods of and installations for anti-skid braking of vehicles, more particularly automobiles, are known for instance from other patent applications by the present applicants.

In these systems various problems of the art of anti-skid braking are solved or mitigated by making the reduction of the braking torque applied to the brakes dependent on the maximum value assumed by this torque in accordance with various criteria which obviate the disadvantages of totally removing this torque as was done in the earlier art. These systems however do not make certain that the reduction of pressure is in fact sufficient to remove the wheel from the state of incipient locking which had given rise to the reduction of the braking torque. In extreme conditions of the ground, and above all in the case of abrupt variations in the grip coefficient of the ground itself along the path followed by the vehicle, it may therefore happen that the reduction of the braking torque is not sufficient to reaccelerate the wheel so as to reduce the slip.

In other anti-skid braking methods and systems, in order to obtain the aforesaid certainty, the braking torque is re-applied, after the initial release command, only when it has been ascertained that the retardation of the wheel has in fact ceased. But even these systems suffer from the disadvantage that the subsequent acceleration of the wheel takes place too slowly and therefore the wheel is permitted to remain in dangerous dynamic states (of high slip) for excessively long periods, resulting in great reduction of the lateral hold, reduction of braking efficiency and consequent lengthening of the braking distance.

Lastly, the anti-skid braking systems known hitherto suffer in general from an excessive delay in the re-application of the braking torque after the occurrence of the release command, and in this case also the result is that the braking efficiency is reduced.

An object of the invention therefore consists in providing a method of anti-skid braking for vehicles in which after the commencement of the reduction of the braking torque the wheel is subjected to accelerating torques of sufficient magnitude to remove the wheel rapidly from the state of incipient locking, so that the time during which the wheel remains in a dangerous dynamic state is reduced to a minimum.

Another object of the invention is to provide an anti-skid braking installation for vehicles which will carry an anti-skid method of the aforesaid type into effect.

The invention achieves the aforesaid and other objects by means of a method of braking a vehicle so as to prevent the wheels from skidding, characterized in that the acceleration of at least one wheel of the vehicle during braking is ascertained, a command for reduction of the braking torque is given when this acceleration exceeds a predetermined negative threshold value, the instant at which this acceleration is eliminated by the said reduction of the torque is ascertained, the braking torque is kept constant at the value which it attains after a predetermined period of time starting from the said instant at which the acceleration of the wheel is eliminated, and the braking torque is permitted to begin to increase again after the instant at which the acceleration of the wheel again begins to decrease.

The invention also consists in a vehicle braking installation for carrying a braking method of the aforesaid type into effect, characterized in that it comprises an ascertaining means co-operating with at least one wheel of the vehicle to supply a signal showing the acceleration of that wheel, a first threshold circuit by which the said acceleration signal is received and, when this signal exceeds a predetermined negative threshold, a closing command is sent to the exciting circuit of a first electrically operated valve normally open between a fluid pressure source and a brake cylinder, and an opening command is simultaneously sent to the exciting circuit of a second electrically operated valve, normally closed, which is interposed between the brake cylinder and a discharge outlet, a second threshold circuit by which the acceleration signal is received and, when the value of this signal passes through zero, a closing command is sent to the exciting circuit of the second electrically operated valve through a delay circuit having a predetermined delay time, and circuit responsive to change of slope by which the acceleration signal is received and, when the sign of the slope of this signal changes, an opening command signal is supplied to the exciting circuit of the first electrically operated valve.

Figure 2:
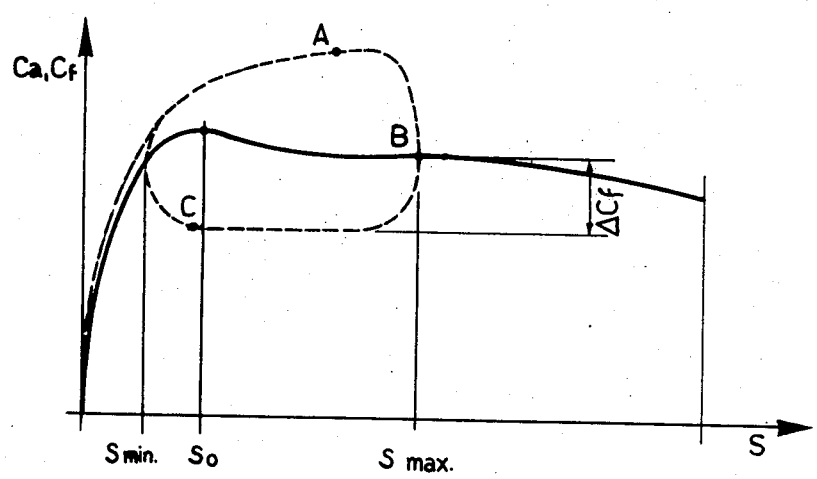
Figure 3:
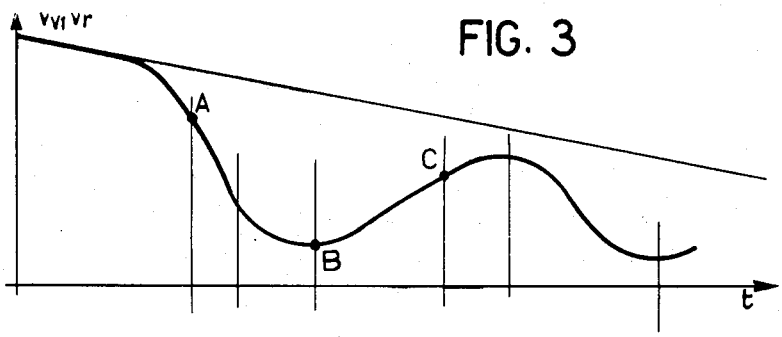
Figure 4:
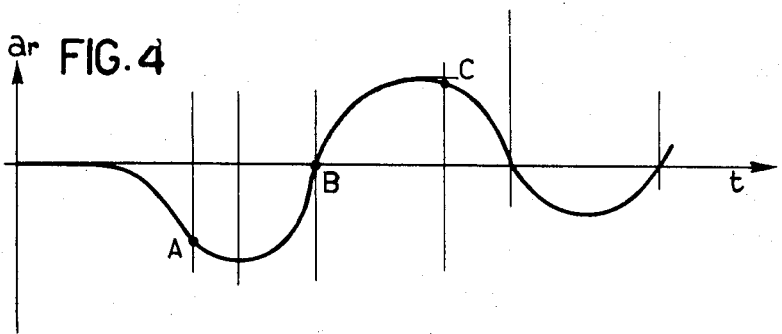
Figure 5:
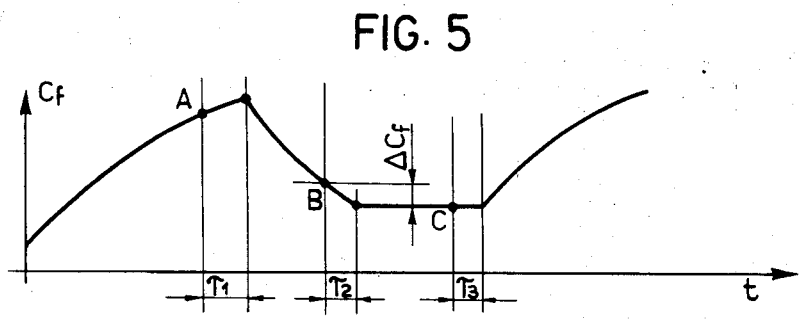
Figure 6:
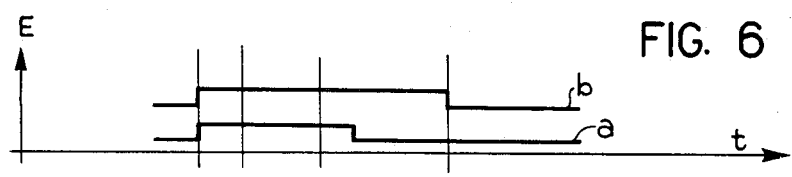
Figure 7:
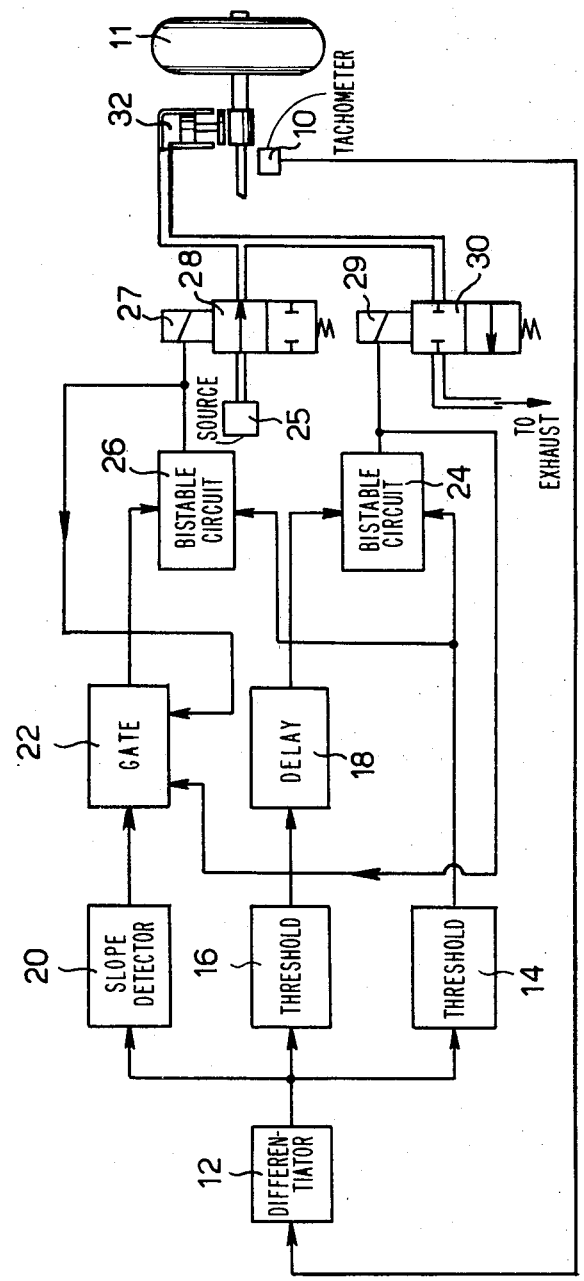

Other objects and advantages of the invention will be made clear by the description of the method of the invention and of a preferred embodiment of a braking installation for carrying this method into effect, which is to be read with reference to the accompanying drawings in which FIG. 1 is a graph showing the variation of the grip torque and of the braking torque on a wheel of a vehicle as functions of the percentage slip of the wheel on the ground, in a conventional braking installation not provided with features that prevent skidding, FIG. 2 is a graph showing the variation of the grip torque and of the braking torque on a wheel of a vehicle as functions of the percentage slip, in accordance with the anti-skid braking method of the invention, FIG. 3 is a graph showing the variation of the speed of the vehicle and of the speed of the wheel as functions of time, when the anti-skid braking method of the invention is used, FIG. 4 is a graph showing the variation of the acceleration of the wheel as a function of time, when the anti-skid braking method of the invention is used, FIG. 5 is a graph showing the variation of the braking torque on a wheel as a function of time, when the anti-skid braking method of the invention is used, FIG. 6 is a graph showing the variation of the command signals applied to the solenoids of a first and a second electrically operated valve forming parts of an anti-skid braking installation in accordance with the invention, and FIG. 7 shows an anti-skid braking installation in accordance with the invention, partly in the form of a block diagram.

In FIG. 1 the continuous curve shows the law governing the relationship between the grip torque, plotted along the axis of ordinates, and the percentage slip of the wheel, plotted along the axis of abscissae.

The expression "grip torque" means the torque exchanged between the tread of the wheel and the ground, and the expression "percentage slip" means the relative difference between the speed of the vehicle and the instantaneous speed of the wheel, or the expression $$s = (v_v - v_r)/v_v$$

where
$v_v$ is the instantaneous speed of the vehicle, and
$v_r$ is the instantaneous speed of the wheel.

The curve showing the relationship between grip torque $C_a$ and slip $s$ can assume various shapes because it depends on the state of the tire, the ground conditions and the speed of the wheel. But although its proportions may vary, its general form remains substantially the same under the most varied conditions.

The curve has a first section which is approximately linear; then passes through a maximum corresponding to $s = 10$ to 25 percent and then descends slowly and finally falls abruptly at slip values close to 100 percent.

The first section of the curve, in which the slip is between 0 and the value $s_0$ corresponding to the maximum value of the grip torque, is called the section of "pseudo-skid" due to the bending of the tread elements subjected to shearing stresses. The maximum value of the grip torque $C_a$ occurs when the tread elements having reached the limit of grip cease to hold, and slide on the ground.

The curve section between the slip value $s_0$ corresponding to the maximum value of the grip torque and unit slip value is called the "skid" section. When $s = 100$ percent the wheel is locked and complete skidding occurs.

In FIG. 1 also, the curve shown by a broken line shows the variation of the braking torque applied to the wheel in a conventional braking system not provided with features that prevent skidding. The expression "braking torque" means the torque exchanged between the brake shoes and the wheel. The braking torque increases progressively as the slip increases, and the "working point" is displaced from zero along the section of pseudo-skid to the maximum grip torque value, and beyond this if the increase in the braking torque is continued.

The difference between the braking torque and the grip torque represents the inertia torque to which the wheel is subjected in accordance with the relationship $$C_f - C_a = k\, a_r$$

where
$C_f$ is the braking torque,
$C_a$ is the grip torque,
$a_r$ is the acceleration of the wheel, and
$k$ is a constant of proportionality related to the moment of inertia of the wheel.

It is clear that when the working point of which the abscissa is $s_0$ is exceeded the inertia torque attains values that cannot be permitted, giving rise to an increasing retardation of the wheel and finally complete locking of the wheel.

The function of an anti-skid braking system is to recognize the condition of skidding, that is to say to recognize that the working point has moved to the right of the abscissa $s_0$, in order to reduce the braking torque applied to the wheel, with the object of bringing the working point back into a safer zone.

According to a technique that is now established in the field of anti-skid braking, the command for reduction of the braking torque is given when a predetermined wheel retardation threshold is exceeded. In FIG. 2, A indicates the braking torque value at which the said release command is given to the braking system. From this point, the braking torque continues to increase for a short time because of the delays in commencement of operation that are inherent in the system, and then falls increasingly rapidly and approaches and finally crosses the grip torque curve.

As stated in the introduction, the hitherto known systems follow various criteria for determining how the system is to behave after the release command. In some cases the braking torque is reduced by a fixed quantity or by a quantity proportional to the value which the braking torque had at the point A. This absolute or proportional reduction is of course predetermined so as to make it relatively certain that the braking torque curve will cross the grip torque curve, so that the retarding inertia torque will thus be eliminated. With these criteria, however, this certainty can only be statistical. Unusual states of the ground, in particular an abrupt transition between very different values of the grip coefficient of the ground, can in fact cause an abrupt descent of the grip torque curve, making the anti-skid action of the braking system ineffective and preventing the braking torque curve from reaching the grip torque curve before braking is resumed.

In order to obviate this, other anti-skid braking systems make certain of elimination of the inertia torque, corresponding to a point of intersection of the braking torque and the grip torque curves, and keep the braking torque at the value of that point until the working point has moved to the left of the abscissa $s_0$. It is essential, however, not only to remove the working point from the zone of point B but also to make this removal extremely rapid. It is therefore necessary not only to eliminate the retarding inertia torque applied to the wheel during braking but also to apply to the wheel itself an accelerating torque which will bring it rapidly back into a safer zone of operation, that is to say to the left of the abscissa $s_0$.

In accordance with the invention, therefore, starting from the point B at which the acceleration of the wheel becomes zero, simultaneously with elimination of the inertia torque to which the wheel is subjected, a command is given for stabilization of the braking torque at a constant value with a time delay such as to ensure the application of an accelerating torque difference $C_a - C_r$ which will rapidly return the wheel to operation in a zone to the left of the abscissa $s_0$.

The introduction of a fixed time delay in the stabilization or "clipping" of the braking torque from the point B onwards is dictated by practical reasons. What is in fact actually desirable is to obtain an accelerating inertia torque, corresponding to the difference in ordinates between the grip torque curve and the braking torque curve, of satisfactory magnitude. However the value of this accelerating inertia torque is not critical and can vary within relatively wide limits provided that is kept above a minimum value. It is justifiable however, for reasons of economy and structural practicability, to make reference to a time delay rather than a torque difference; the final result will be to obtain an accelerating torque greater than a predetermined value.

It is essential at this point to ensure that braking is resumed, that is to say that restoration of the braking torque applied by the driver of the vehicle by means of the brake pedal is permitted, extremely promptly.

The working point should not in fact move too far to the left of the abscissa $s_0$, because this zone, although safe from skid situations, is nevertheless ineffective for braking. It is therefore important to give the command for resumption of braking as soon as the slip of the wheel becomes less than the value $s_0$ corresponding to the maximum value of the grip torque. In accordance with the invention, therefore, this command for resumption of braking is given as soon as the acceleration of the wheel, which is proportional to the value of the inertia torque, that is to say to the instantaneous difference between the grip torque and the braking torque, begins to decrease after having passed through a maximum. It can in fact be seen that from the point of maximum slip, corresponding to the point B, onwards, the difference $C_a - C_f$ is increasing, or at least constant, as far as the point of which the abscissa is $s_0$, after which the said torque begins to decrease. When the command for resumption of braking is given at the point C, the braking torque begins to increase again, subject to the delays inherent in the system, and the curve reaches a minimum slip $s_{min}$ and then rejoins the previous rising a curve and returns to the point A where the cycle recommences.

The course of the anti-skid braking cycle can be better understood with reference to FIGS. 3 and 4. In FIG. 3 the thick curve shows the speed of the wheel as a function of time, whereas FIG. 4 shows the variation of the acceleration of the wheel, also as a function of time, that is to say the derivative of the curve in FIG. 3. The speed $v_v$ of the vehicle is also shown by the thin curve in FIG. 3. The critical points in the cycle are indicated in FIGS. 3 and 4. Point A is the point at which the state of excessive retardation of the wheel is ascertained. After a delay $\tau_1$ inherent in the system, there is a flex in the speed $v_r$ of the wheel, corresponding to a point of minimum acceleration. Point B corresponds to zero acceleration. After a delay $\tau_2$ which is introduced deliberately as stated above, the braking torque is locked at a constant value which causes progressive restraint of the acceleration of the wheel until the acceleration reaches a maximum point and begins to decrease. The beginning of the decrease in acceleration is ascertained at point C, in order to give a command for resumption of braking whereby the braking torque is increased.

The variation in the braking torque can be followed in FIG. 5, which shows the delay $\tau_2$ introduced in the application of the command for "clipping" of the braking torque.

An anti-skid braking installation for carrying this anti-skid braking method into effect will now be described with reference to FIG. 7.

A tachometer 10 ascertains the speed of a wheel 11 of a vehicle and applies the speed signal to a differentiator 12 which supplies a wheel acceleration signal as its output.

The acceleration signal is transmitted to a first threshold circuit 14 which supplies an output signal, when the input signal exceeds a predetermined negative threshold, for setting a bistable circuit 24 and a bistable circuit 26.

The two voltage steps supplied at the output of the two bistable circuits 24 and 26 as a result of this setting excite the respective solenoids 27 and 29 of two solenoid-operated valves 30 and 28. The solenoid-operated valve 28, normally open between a fluid pressure source 25 and the brake cylinder 32 for braking the wheel 11, closes and ceases to admit pressure to the brake cylinder 32. The solenoid-operated valve 30, normally closed, is opened by the signal from the bistable circuit 24 so as to permit discharge of the pressure in the brake cylinder 32. The voltage steps of the bistable circuits 24 and 26 are shown by the curves $a$ and $b$ respectively in FIG. 6.

When the acceleration signal supplied by the unit 12 passes through zero (point B), a second threshold circuit 16 which receives the output signal of the differentiator 12 supplies an output signal; through a delay circuit 18 having a predetermined time delay, this output signal resets the bistable circuit 24, returning its output to low voltage and thus de-energizing the solenoid-operated valve 30, which closes again and prevents discharge of the pressure still present in the brake cylinder 32. The pressure in the brake cylinders 32 is thus kept substantially constant at the value attained.

The acceleration signal supplied by the unit 12 is also transmitted to a unit 20 consisting of a slope-ascertaining circuit which responds to the change of slope of the acceleration curve and supplies an output signal when the value of the acceleration after having passed through a maximum begins to decrease (point C). Through a gate circuit 22 activated by the outputs of the bistable circuits 24 and 26, the output signal of the unit 20 resets the bistable circuit 26, de-energizing the electrically operated valve 28, which re-opens and readmits pressure to the brake cylinder 32. The purpose of the gate circuit 22 is to prevent wrong resettings of the bistable circuit 26, due to errors in ascertaining change of slope in the unit 20, caused for instance by noises in the signal, small spurious variations in acceleration and the like.

The braking installation described may be constructed either in a hydraulic or a pneumatic form, with suitable modifications known to those skilled in the art. It is also possible to make various changes in the logical circuits, provided that they perform the functions indicated. It is also to be noted that in practice the outputs of the bistable circuits 24 and 26 will be raised by means of suitable amplifiers to a level of power sufficient to excite the solenoid-operated valves 30 and 28. The tachometer 10 and the differentiator 12 can also be replaced as a whole by an accelerometer in cases where this is found to be more suitable.

What we claim is:

1. A method of anti-skid braking control of a vehicle wheel comprising the following steps:

a. initiating release of braking and allowing the wheel to decelerate under inertia forces;
b. surveying a first instant when the wheel begins to accelerate under friction with the road;
c. surveying a second instant when the acceleration of the wheel becomes zero;
d. keeping the braking torque on the wheel constant at the value it reaches after a predetermined time has elapsed from the said second instant;
e. surveying a third instant when the wheel again begins to decelerate;
f. re-applying a braking torque on the wheel after a predetermined time from the said third instant.

2. In an apparatus for the anti-skid braking of a vehicle wheel, including a braking cylinder for actuating a brake of the wheel, a source of pressure for supplying pressure to the brake cylinder through a first normally open solenoid-operated valve, a second normally closed solenoid-operated valve connected between the brake cylinder and exhaust, and means to cause the first valve to close and the second valve to open, the improvement that such means comprise:
a. accelerometer means co-operating with the wheel to supply an acceleration signal,
b. a first threshold circuit which receives the acceleration signal and, when this signal exceeds a predetermined negative threshold, sends a closing command to a bistable circuit having its output connected to the solenoid of the first valve and an opening command to a bistable circuit having its output connected to the solenoid of the second valve,
c. a second threshold circuit receiving the acceleration signal and sending, when this signal passes through zero, a closing command to the bistable circuit having its output connected to the solenoid of the second valve, through a delay circuit having a predetermined delay time, and
d. a circuit responsive to change of slope, which receives the acceleration signal and, when the sign of the slope of this signal changes, supplies an opening command to the bistable circuit connected to the first valve.

3. The apparatus of claim 2, characterized in that the command given by the circuit responsive to change of slope is delivered to the bistable circuit connected to the solenoid of the first valve through a gate circuit which is enabled by the output signals of the first and the second bistable circuits occurring simultaneously.

4. The apparatus of claim 2, characterized in that the accelerometer means comprises a tachometer means and a differentiator connected in cascade.

* * * * *